United States Patent [19]

Pietsch

[11] Patent Number: 4,770,706

[45] Date of Patent: Sep. 13, 1988

[54] AQUEOUS INK AND PROCESS FOR ITS MANUFACTURE

[75] Inventor: Günter Pietsch, Isernhagen, Fed. Rep. of Germany

[73] Assignee: Pelikan AG, Hanover, Fed. Rep. of Germany

[21] Appl. No.: 115,002

[22] Filed: Oct. 28, 1987

[30] Foreign Application Priority Data

Oct. 29, 1986 [DE] Fed. Rep. of Germany ....... 3636726

[51] Int. Cl.$^4$ .............................................. C09D 11/04
[52] U.S. Cl. ........................................ 106/24; 106/20;
106/161
[58] Field of Search .................... 106/20, 24, 124, 161

[56] References Cited

PUBLICATIONS

Derwent Abstract Accession No. 87-133468/19. Japanese Patent No. J62074974, Apr. 6, 1987.
Derwent Abstract Accession No. 87-067597/10, Japanese Patent No. J62019483, Jan. 28, 1987.

Primary Examiner—Amelia Burgess Yarbrough
Attorney, Agent, or Firm—Herbert Dubno

[57] ABSTRACT

The invention relates to an aqueous ink for writing, drawing, or marking, which has as a dispersion stabilizer a degradation product of gelatin made by enzymatic action of a protease. The process of the invention is carried out by subjecting an aqueous gelatin solution to degradation by an enzyme, then inhibiting the enzyme, such as by heating to 90 degrees C. or above, before the degradation has proceeded to products which no longer have activity as dispersion stabilizers. Subsequently, colorants such as pigments can be added along with other desired additives.

7 Claims, No Drawings

AQUEOUS INK AND PROCESS FOR ITS MANUFACTURE

FIELD OF THE INVENTION

My present invention relates to an aqueous fluid for writing, marking, and drawing, hereinafter called an aqueous ink, which comprises water, colorants, dispersion stabilizers, and possibly binders, wetting agents, optical brighteners, solvents, and other additives. My invention also relates to a process for making such aqueous inks.

BACKGROUND OF THE INVENTION

Writing fluids, i.e. various kinds of inks, are known containing gelatin breakdown products as dispersion stabilizers; for instance as described in Chemical Abstracts 101 (22), 193881y (1984) and Chemical Abstracts 102 (8), 63782b (1985). For the production of such inks, it has been proposed to employ a gelatin glue solution which has been degraded by acid hydrolysis. In order to produce such a glue solution, commercial gelatin is treated in an aqueous solution at an elevated temperature with concentrated sulfuric acid. After the acid hydrolysis of the gelatin, the acid must be removed, which is done by adding successive portions of barium hydroxide, bringing about precipitation of barium sulfate. The precipitated barium sulfate is removed from the solution by filtration. The filtrate, a low viscosity gum solution, must then be concentrated by the expenditure of considerable energy, in order to bring the active ingredient up to the concentration required for efficacy in ink formulations.

The above-described process exhibits many disadvantages. Thus, the starting solution must be relatively dilute or low in viscosity, in order for the sulfuric acid to bring about the desired degree of degradation. At higher viscosities, the poor dispersion of the sulfuric acid leads to damage to the gelatin molecule, which has an adverse effect on the properties of the ink. The handling of sulfuric acid, especially concentrated sulfuric acid, requires specially stringent safety precautions. The introduction of barium hydroxide is also a matter of toxicological concern. The precipitated barium sulfate must be removed so completely that no toxicologically-significant amount of this by-product appears in the final ink. The disposal of barium sulfate, contaminated with adhering amounts of gelatin breakdown products, can be costly and troublesome.

In order to obtain filterable crystals of the precipitated barium sulfate, it is necessary to use well-controlled process conditions. In this regard, it is especially necessary for the crystallization process to run for a long period of time, in order to obtain the desired crystal size. Therefore, the barium hydroxide addition must be done at an inconveniently slow rate. Further problems arise in connection with disposal of the barium sulfate, which because of its toxicity must be placed in special toxic waste dumps. Moreover, there is not only the necessity for precipitating the sulfuric acid quantitatively but also the necessity to avoid an excess of barium hydroxide, which is also a matter of toxicological concern.

OBJECT OF THE INVENTION

It is an object of the invention to make available an aqueous ink and means for producing it which avoid the aforementioned difficulties of the prior art.

SUMMARY OF THE INVENTION

The object of the invention is accomplished by making available an aqueous ink comprising water, a colorant, and a dispersion stabilizer wherein the dispersion stabilizer is a colloidally dissolved enzymatic degradation product of gelatin.

The invention also makes available a process for producing such aqueous ink, wherein an aqueous solution of gelatin is degraded to a controlled extent by means of an enzyme, to form a dispersion stabilizer.

DETAILED DESCRIPTION OF THE INVENTION

In regard to its compositional aspect, the present invention is an aqueous ink, i.e. an aqueous fluid for writing, marking, or drawing, which is comprised of water, a colorant, and a dispersion stabilizer which is a colloidal solution resulting from the controlled enzymatic degradation of gelatin. The aqueous ink in accordance with the invention can comprise any desired colorant, such as pigments or soluble colors, but the concept of the invention is especially applicable where at least part of the colorant is a pigment.

In particular cases, it is advantageous to add, in addition to the gelatin breakdown product as a dispersion stabilizer, further dispersion stabilizers or binders, such as casein or low molecular weight acrylates.

The process of the invention is characterized by degrading an aqueous gelatin solution by degradatory enzymes which cleave the gelatin particles upon warming into degradation products, and then inhibiting the enzymatic breakdown before cleavage products are produced which are no longer able to exhibit dispersion stabilizing properties in an aqueous medium, and then to the solution thus obtained, after cooling to the requisite degree, adding the desired ink colorant along with any other desired additives, such as binders, additional dispersion stabilizers, wetting agents, optical brighteners, and solvents.

The essence of the invention consists of the degrading of the gelatin particles in aqueous solution by suitable enzymes and then stopping this degradation when the particle size is still sufficient for the dispersion stabilization of the final ink. This means that the degradation must not go too far, such as ultimately to the point where only amino acids are present. In order to assess the appropriate point at which the gelatin degrading enzymes should be inhibited, it is quite simple for the operator to do some preliminary small-scale tests. In every case, it is important that that a colloidal solution be present at the end. For the determination of this colloidal solution, several methods are available to the process operator, for example, the so-called Tyndall effect may be used; alternatively, the determination of viscosity may be used, since the viscosity is reduced by the degradation of the gelatin. By means of simple tests, it can be readily ascertained at which viscosity the enzyme inhibition should be performed. For instance, the degradation can be carried out to the point where the Tyndall beam effect (light scattering effect of colloids, well known in the art and science of colloids) is still visible. Or, the degradation can be carried out to the point where the viscosity of the solution is much lower than that of the initial solution of gelatin but not as low as that of fully degraded gelatin, as determined by use of any of the types of viscosimeters well known in the art of viscosity measurement.

In regard to the gelatin starting material, the present invention does not impose any limitations. This starting material can be of any origin, for example, from bone or hide gelatin of various domesticated animals.

Since, in accordance with the invention, a colloidal degraded gelatin solution is converted to a colored ink, the color of the starting material is of little importance. A very suitable raw material is the so-called hide glue, which is a gelatin starting material made from animal skins. These hide glues can be further characterized by the following data: pH value 6.5 to 7.3, ash content 1.3 to 2.3%, water content 10 to 15%, acid content 0.05 to 0.14% and fat content 0.40 to 1.3%. The fat content should not exceed 1.5%, otherwise it can be a troublesome impurity in later steps. These glues are articles of commerce. The same is true for the enzymes required for the breakdown. Examples include Enzylase K 40 of Diamalt AG, Enzym P 300 of Henkel & Cie. GmbH or Alcalase T of Novo Industrie GmbH.

The invention is not subject to any essential limitations in regard to the quantity of the enzyme and gelatin in the starting solution. As a guideline, it can be stated that from a practical and economic point of view, the gelatin solution should contain about 10 to 50 weight % gelatin, and even up to 60% in some cases. In practice, the range from about 30 to 45 weight % and especially from about 35 to 40 weight % and most optimally about 40 weight % has been found useful. It is advantageous to adapt the enzyme quantity to the gelatin concentration. With higher gelatin concentration, an elevated enzyme quantity is necessary, unless the process operator chooses to have longer degradation times. Typically, an effective amount of the enzyme will be in the range of 0.05 to 1 weight %, preferably 0.05 to 0.2 weight %.

The degradation times lie as a rule in the range of about 30 minutes to 3 hours at degradation temperatures of about 40 to 70 degrees C. (preferably 55 to 60 degrees C.). In this connection, the type and concentration of the chosen enzyme plays a part.

As enzymes for the degradation of gelatin protein, fundamentally, proteases are required, which have the capability of cleaving peptide linkages of proteins and oligopeptides. The enzymes suitable for use in the process of the invention and available commercially are often not pure individual substances but can consist of various enzymes, each of which is capable only of cleaving specific peptide groupings.

For example, Enzyme P 300 consists of a mixture of several peptidases, in which the so-called endo- as well as exopeptidases are present, differing in their preferred substrates. An advantage of the use of enzymes in accordance with the present invention is that, in contrast to the non-enzymatic hydrolysis of proteins, it is less likely for the hydrolysis to go all the way to the monomeric amino acids, which are essentially useless in regard to dispersion stabilizing properties.

The proteolytic breakdown of gelatin by use of the commercially available enzyme Enzylase K 40 (from Diamalt AG) runs for example from a pH value of 7 to 7.5. This value establishes itself spontaneously when gelatin is dissolved in water. Using a concentration of 0.1 weight % Enzylase K 40 in an approximately 42 weight % solution of gelatin in common tap water of medium hardness at about 60 degrees C., after an incubation time of 30 to 60 minutes, the proteolytic degradation has gone far enough. There is produced a colloidal solution which imparts good film forming and excellent dispersion stabilizing properties to the ink.

The proteolytic reaction time is not only dependent on the quantity of the gelatin substrate to be degraded but on the ambient conditions of pH value, water hardness, temperature, heavy metal ion concentration, etc. and especially on the activity of the specific enzyme used. Thus, Enzylase K 40 shows an activity of 250,000 LVE/g (Lohlein-Volhardt Einheiten [=units]). According to the manufacturer's data, Protease P 300 shows an activity of 614,000 PE/g (Protease-Einheiten [=protease units]per gram). In the trade literature, much has been published regarding determination of enzyme activity, so that no further details need to be given here.

As a general rule, it can be said that when the activity number by any measure of activity is doubled, the activity is doubled, i.e. the time for the reaction is halved. The process operator can therefore use very simple tests to select the most suitable and most preferable enzyme concentration, taking into account the reaction conditions as described above.

The proteolysis can and should be inhibited at a definite selected stage of the process. For this purpose, it is suitable to use not only inhibition by heating, as mentioned before, but also inhibitory substances can be added, however there is generally no advantage to this method over heat inhibition.

The inhibition can also, for example, be done by changing the pH, by which means an excessively basic or excessively acidic medium is produced, in which the enzyme is inactive or completely killed. Also, certain oxidizing agents can be added. Heat inhibition is, however, an especially elegant method; the proteolysis is stopped by irreversible inactivation of the protease by heating of the system to at least 90 deg. C. and especially to 95 to 100 deg. C.

In this version of the process, the concentration of the starting solution may be increased to even as high as 60 wt.-% without causing any later difficulties.

By virtue of the foregoing disclosure, the process operator can carry out the invention without difficulty. This is true regardless of what type of aqueous ink is produced, whether of a pigmented or dye-tinted variety. He may use dyes or pigments, such as carbon black, colored pigments, artificial light or daylight pigments, or white pigment, and also any of the other customary additives, and by virtue of the dispersion stabilization effect of the gelatine degradation product, a very stable dispersion will always be obtained.

The advantages of the invention may be summarized as follows. In the above-described prior-art acid hydrolysis process, toxic and commercially-useless byproducts are produced, consequently the cost is excessive. The present invention does not have this disadvantage. A roughly calculated raw material cost comparison of the prior art process and the process of the present invention shows that the enzymatic degradation by the process of the invention has an additional raw material cost per 100 kg of gelatin amounting to only 5 to 10% of the cost of the acid process. Moreover, there is an additional cost reduction, arising from the reduced time requirement as well as from the reduced energy requirement (evaporation of a large amount of water from the very dilute glue solution in the prior art process).

The enzymatic degradation is technologically uncomplicated and simple to carry out. By maintaining definite process conditions, no byproducts are formed Which have to be removed from the solution.

In general it can be ascertained by analysis whether a gelatin degradation product has resulted from acid hydrolysis or proteolytic action. For this purpose, the characteristic "fingerprint" in the 2D electrophoresis can be used.

The following example will further elucidate the invention.

EXAMPLE

To 57.9 parts by weight of tap water at a temperature of about 20 deg. C., 42.0 parts by weight of gelatin powder were added. Then, the mixture was warmed to 60 degrees C. over 30 minutes with stirring, forming a highly viscous solution. To this solution at about 60 degrees C. was added with stirring 0.1 part by weight of a commercial protease (Enzylase K 40). After only a few minutes, a strong viscosity decrease was evident. After 30 min. reaction time, the water temperature was raised to 95 degrees C. The temperature was then held for 20 minutes at 95 degrees C. Thereby, there was obtained an aqueous gelatin solution with an FB4 viscosity value of about 17 seconds (drainage time in seconds from a Ford beaker with a no. 4 nozzle).

The gelatin solution degraded as described above exhibited outstanding dispersion stabilizing properties and could be further processed in a known manner to make aqueous inks, i.e. writing, drawing, and marking fluids.

I claim:

1. An aqueous ink comprising water, colorant, and dispersion stabilizer, wherein said dispersion stabilizer is a colloidally dissolved product of the controlled enzymatic degradation of gelatin.

2. An ink as defined in claim 1 wherein the colorant is a pigment.

3. A process for the production of an aqueous ink which comprises degrading an aqueous gelatin solution by means of a gelatin-degrading enzyme, inhibiting the action of the enzyme before the formation of degradation products inactive as dispersion stabilizers, and then adding colorants.

4. A process in accordance with claim 3 in which the inhibition of the action of the enzyme is carried out by heating the solution to at least 90 degrees C.

5. A process in accordance with claim 3 in which the inhibition of the action of the enzyme is carried out by heating the solution at about 95 to 100 degrees C.

6. A process in accordance with claim 3 wherein the starting gelatin solution has a concentration in the range of about 10 to 60 weight % gelatin, the degradation time is in the range of about 30 minutes to 3 hours, the degradation temperature is in the range of about 40 to 70 degrees, and the enzyme is a protease used in an effective gelatin-degrading amount.

7. A process in accordance with claim 6 where the protease is present at about 0.05 to 1 weight %.

* * * * *